United States Patent
Behrens et al.

(10) Patent No.: US 9,039,366 B2
(45) Date of Patent: May 26, 2015

(54) CONTROL OF WIND TURBINE BLADE LIFT REGULATING MEANS

(75) Inventors: Tim Behrens, KØbenhavn S (DK); Li Hong Idris Lim, Singapore (SG); Tian Lim, Singapore (SG); Chee Kang Lim, Singapore (SG); Teck Bin Arthur Lim, Singapore (SG); Kok Leong Chong, Singapore (SG); Whye Ghee Kim, Singapore (SG); Yun Chong Gabriel Chang, Singapore (SG); Loh Wuh Ken, Singapore (SG)

(73) Assignee: Vestas Wind Systems A/S, Aarhus N. (DK)

(*) Notice: Subject to any disclaimer, the term of this patent is extended or adjusted under 35 U.S.C. 154(b) by 556 days.

(21) Appl. No.: 13/509,187

(22) PCT Filed: Nov. 11, 2010

(86) PCT No.: PCT/DK2010/000149
§ 371 (c)(1),
(2), (4) Date: May 22, 2012

(87) PCT Pub. No.: WO2011/057633
PCT Pub. Date: May 19, 2011

(65) Prior Publication Data
US 2012/0224965 A1 Sep. 6, 2012

Related U.S. Application Data

(60) Provisional application No. 61/260,416, filed on Nov. 12, 2009.

(30) Foreign Application Priority Data

Nov. 11, 2009 (DK) ................................ 2009 70199

(51) Int. Cl.
*F03D 7/04* (2006.01)
*F03D 7/02* (2006.01)
*F03D 1/06* (2006.01)

(52) U.S. Cl.
CPC .............. *F03D 7/0232* (2013.01); *F03D 1/065* (2013.01); *F03D 7/0224* (2013.01); *F03D 7/042* (2013.01);

(Continued)

(58) Field of Classification Search
CPC ...... F03D 1/065; F03D 7/0224; F03D 7/0232; F03D 7/042; F05B 2240/31; F05B 2270/309; F05B 2270/331; F05B 2270/602
See application file for complete search history.

(56) References Cited

U.S. PATENT DOCUMENTS 4,161,658 A * 7/1979 Patrick ............................ 290/44
5,320,491 A * 6/1994 Coleman et al. ................ 416/24

(Continued)

FOREIGN PATENT DOCUMENTS

WO 2004/099608 11/2004
WO 2008/080407 7/2008

(Continued)

OTHER PUBLICATIONS

Nagarajan Hariharan et al.; Article entitled "Unsteady Aerodynamics of a Flapped Airfoil in Subsonic Flow by Indicial Concepts"; Journal of Aircraft, vol. 33, No. 5; Sep.-Oct. 1996; 14 pages; University of Maryland, College Park, Maryland 20742.
Jens Skou; 1st Technical Examination and Search Report issued in priority Denmark Application No. PA 2009 70199; Jun. 27, 2010; 4 pages; Denmark Patent and Trademark Office.

(Continued)

*Primary Examiner* — Igor Kershteyn
(74) *Attorney, Agent, or Firm* — Wood, Herron & Evans, LLP

(57) ABSTRACT

The invention involves a wind turbine comprising at least one blade (5) in turn comprising a blade body (501), lift-regulating means (502) adapted for movement in relation to the blade body (501) so as to regulate the lift of the blade, and load sensing means (5022, 506) for determining a load acting on the lift-regulating means (502), the wind turbine further comprising an actuation control unit (6) adapted to control the movement of the lift-regulating means (502) based on output from the load sensing means (5022, 506). In addition to output from the load sensing means (5022, 506), the actuation control unit (6) is adapted to control the movement of the lift-regulating means (502) based on the movement of the lift-regulating means (502).

15 Claims, 4 Drawing Sheets

(52) U.S. Cl.
CPC ....... *F05B 2240/31* (2013.01); *F05B 2270/309* (2013.01); *F05B 2270/331* (2013.01); *F05B 2270/602* (2013.01); *Y02E 10/721* (2013.01); *Y02E 10/723* (2013.01)

(56) References Cited

U.S. PATENT DOCUMENTS

| | | | |
|---|---|---|---|
| 7,476,985 B2* | 1/2009 | Llorente Gonzalez | 290/44 |
| 2005/0103928 A1 | 5/2005 | Flatt | |
| 2006/0140760 A1* | 6/2006 | Saddoughi et al. | 416/23 |
| 2006/0140761 A1* | 6/2006 | LeMieux | 416/61 |
| 2009/0021015 A1 | 1/2009 | Pedersen | |
| 2009/0039651 A1* | 2/2009 | Stiesdal | 290/44 |
| 2010/0215493 A1* | 8/2010 | Abdallah et al. | 416/23 |

FOREIGN PATENT DOCUMENTS

| | | |
|---|---|---|
| WO | 2009/056136 | 5/2009 |
| WO | 2009/061478 | 5/2009 |

OTHER PUBLICATIONS

Laurent Libeaut; International Search Report and Written Opinion issued in priority International Application No. PCT/DK2010/000149; Sep. 15, 2011; 10 pages; European Patent Office.

International Preliminary Report on Patentability from counterpart PCT Application No. PCT/DK2010/000149, issued May 15, 2012 (8 pages).

Hariharan Nagarajan et al, "Unsteady aerodynamics of a flapped airfoil in subsonic flow by indicial concepts", Journal of Aircraft, AIAA, Reston, VA. US; vol. 33 No. 5, Sep. 1, 1996 (pp. 855-868) (XP008142561).

* cited by examiner

CONTROL OF WIND TURBINE BLADE LIFT REGULATING MEANS

TECHNICAL FIELD

The invention relates to a wind turbine comprising at least one blade in turn comprising a blade body, lift-regulating means adapted for movement in relation to the blade body so as to regulate the lift of the blade. The invention also relates to a method for controlling such a wind turbine.

BACKGROUND

What is herein referred to as lift-regulating means relates to any type of active aerodynamic control surfaces which are adapted to alter the surface of the wind turbine blade so as to regulate the lift thereof. In particular, such lift-regulating means allow load alleviation, and/or higher lift at a start-up procedure of the turbine. For blades with lift-regulating means, flow sensing is an important topic, see e.g. T. K. Barlas and G. A. M. van Kuik. "State of the art and prospectives of smart rotor control for wind turbines", The Science of Making Torque from Wind; Journal of Physics: Conference Series, volume 75, 2007. This is regardless of the particular embodiment of the lift-regulating means, for example whether it is embodied as rigid hinged flaps, (see e.g. WO2009056136), or pneumatic flexible trailing edges without hinges, (see e.g. WO2008132235, or WO2007045940).

To obtain the flow data, in particular angle of attack, and load data, it has been suggested to use pitot tubes and/or pressure tabs, see e.g. H. A. Madsen and A. Fischer, "Wind shear and turbulence characteristics from inflow measurements on the rotating blade of a wind turbine rotor" 2009, presented at 2009 European Wind Energy Conference and Exhibition, Marseille (FR), 16-19 Mar. 2009. Disadvantages of such sensors are mainly their high extra costs, as well as reliability and servicing issues, which are a hindrance to using them in serial production.

Another idea to sense local loading, disclosed in WO2009056136, is to directly measure the hinge moment acting upon an installed trailing edge flap. This input can then be utilised to control the flap movement directly. No sensor parts outside the blade are needed, and one can think of a variety of very robust hinge moment sensors. However, where such trailing edge flap hinge moment is measured, there is a desire to further improve the control of the lift-regulating means.

SUMMARY

An object of the invention is to improve the control of lift-regulating means of a wind turbine blade, where load sensing means for determining a load acting on the lift-regulating means are provided, and the movement of the lift-regulating means is controlled based on output from the load sensing means.

This object is reached with a wind turbine comprising at least one blade in turn comprising a blade body, lift-regulating means adapted for movement in relation to the blade body so as to regulate the lift of the blade, and load sensing means for determining a load acting on the lift-regulating means, the wind turbine further comprising an actuation control unit adapted to control the movement of the lift-regulating means based on output from the load sensing means, characterized in that, in addition to output from the load sensing means, the actuation control unit is adapted to control the movement of the lift-regulating means based on the movement of the lift-regulating means.

It is understood that the time of the control of the movement of the lift-regulating means is subsequent to the time of the movement of the lift-regulating means, based on which said control is performed. I.e. the control of the movement at a certain point in time is based on at least one movement at at least one point in time preceding the time of said control.

The movement of the lift-regulating means can for example be a rate of movement, in particular a deflection rate, of the lift-regulating means. In addition to the movement of the lift-regulating means, the actuation control unit can be adapted to control the movement of the lift-regulating means based on the position of the lift-regulating means. The position of the lift-regulating means can for example be a deflection of the lift-regulating means. It should be pointed out that the position, e.g. deflection, of the lift-regulating means can be determined based on the movement, e.g. deflection rate, of the lift-regulating means, and vice versa.

The load detected by use of the load sensing means has a component caused by inflow onto the blade and the lift-regulating means, and a component of unsteady loading caused by the position and movements of the lift-regulating means. For example, in the case of a rigid hinged flap, a flap movement used to control the loading strongly influences the hinge moment. By controlling the movement of the lift-regulating means based on the position and movement of the lift-regulating means, this influence can be reduced or eliminated.

The lift-regulating means comprises actuation means adapted to effect the movement of the lift-regulating means, and the actuation control unit is adapted to control the movement of the lift-regulating means via the actuation means. As exemplified below, the load sensing means could comprise one or more sensors for detecting a load acting on the lift-regulating means, for example by sensing a load on the actuation means, e.g. a force, a hinge moment, a pressure, or a strain. Where the actuation means comprises an electric motor, the load sensing means could be used for determining a current or voltage in the motor. Alternatively, the load sensing means could be used for detecting a load acting on the lift-regulating means, by measuring a force, strain, at some location which is separate from the actuation means.

Movement sensing means can be provided for determining the movement of the lift-regulating means. The movement sensing means can also be used for determining the position of the lift-regulating means. This provides feedback to control unit on the position and movement of the lift-regulating means. For example, in the case of the lift-regulating means being embodied as one or more rigid hinged flaps, the movement sensing means can be embodied as a deflection sensor adapted to detect the flap deflection and the flap deflection rate.

It should be noted that the term "flap deflection" it to be understood as the actual physical deflection i.e. the distance the flap is deflected from a point A to a point B and that the term "flap deflection rate" is a measurement of how fast this deflection occurs i.e. how long does it take for the flap to be deflected from point A to point B.

Alternatively, the actuation control unit can be adapted to use at least one control signal sent at a first point in time for the movement of the lift-regulating means, as a basis for the control of the movement of the lift-regulating means at a second point in time, subsequent to the first point in time. For example, where the control for the lift-regulating means position and movement is carried out in sequential small time steps, one or more control signals sent at a time at (t1) can be used as a basis for determining control signals sent at a subsequent point in time (t2=t1+dt). Thus, no feedback regarding lift-regulating means position or movement is needed.

Preferably, the actuation control unit is adapted to control the movement of the lift-regulating means based on the movement of the lift-regulating means by the use of an unsteady aero model by which a load acting on the lift-regulating means due to the movement of the lift-regulating means, can be determined. The unsteady aero model can also be adapted to determine a load acting on the lift-regulating means due to the position of the lift-regulating means. The unsteady aero model can for example be provided as a linearised model for calculating an unsteady hinge moment implemented according to N. Hariharan and J. G. Leishman, "Unsteady aerodynamics of a flapped airfoil in subsonic flow by indicial concepts", Journal of Aircraft, 33(5):855-868, 1996.

Preferably, the actuation control unit is adapted to determine, based on the movement of the lift-regulating means, a correction of said output from the load sensing means, and to control the movement of the lift-regulating means based on said correction. The correction can also be based on the position of the lift-regulating means.

Preferably, the lift-regulating means comprises at least one electric motor in turn comprising the load sensing means.

Preferably, where the lift-regulating means comprises a trailing edge flap, the actuation control unit is adapted to control the movement of the lift-regulating means also based on the inertia of the flap. Specially where the trailing edge flap is rigid, and the actuation means comprises the load sensing means so that the load is measured on the actuation means, this will allow for dynamic forces caused by said inertia to be taken into account.

The object is also reached with a wind turbine comprising at least one blade in turn comprising a blade body, and lift-regulating means adapted for movement in relation to the blade body so as to regulate the lift of the blade and comprising actuation means adapted to effect the movement of the lift-regulating means, the blade further comprising load sensing means for determining a load acting on the lift-regulating means, the wind turbine further comprising an actuation control unit adapted to control the movement of the lift-regulating means via the actuation means based on output from the load sensing means, characterized in that the actuation means comprises an electric motor in turn comprising the load sensing means. Preferably, the output from the load sensing means is a current and/or a voltage of the electric motor, and the actuation control unit is adapted to control the movement of the lift-regulating means via the actuation means based on current or voltage of the electric motor. Preferably, in addition to output from the load sensing means, the actuation control unit is adapted to control the movement of the lift-regulating means via the actuation means based on the movement of the lift-regulating means.

The object is also reached with a method according to any of the claims 11-15.

DESCRIPTION OF THE FIGURES

Below, embodiments of the invention will be described with reference to the drawings, in which.

DETAILED DESCRIPTION

Figure 1:
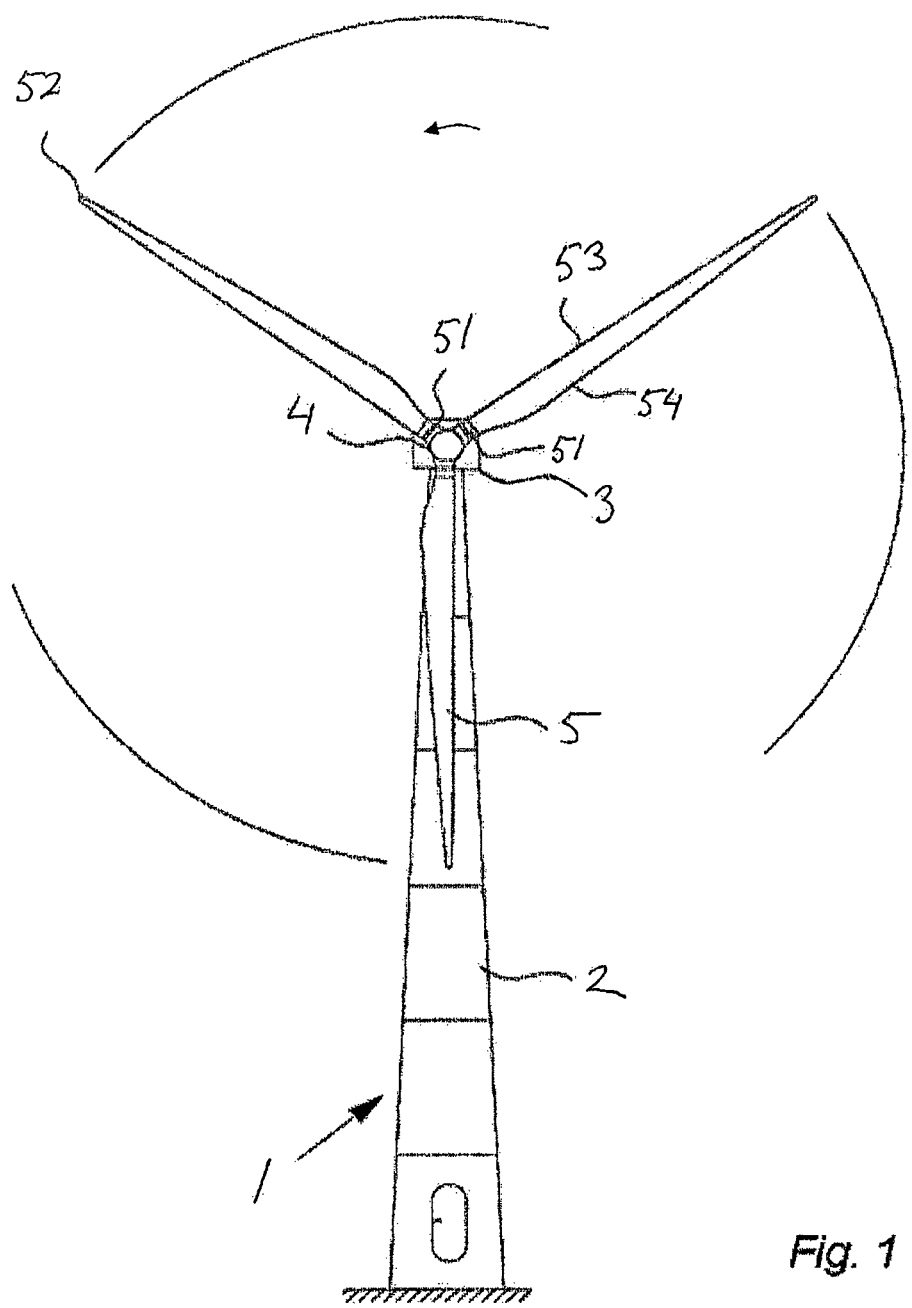
FIG. 1 shows a front view of a wind turbine.

FIG. 1 shows a wind turbine 1 with a tower 2, on top of which a nacelle 3 is provided, carrying a rotor with a hub 4 and three blades 5. Each blade 5 presents a leading edge 53 and a trailing edge 54, and is individually pitch controlled by being rotatable around its longitudinal direction extending from a root 51 to a tip 52.

Figure 2:
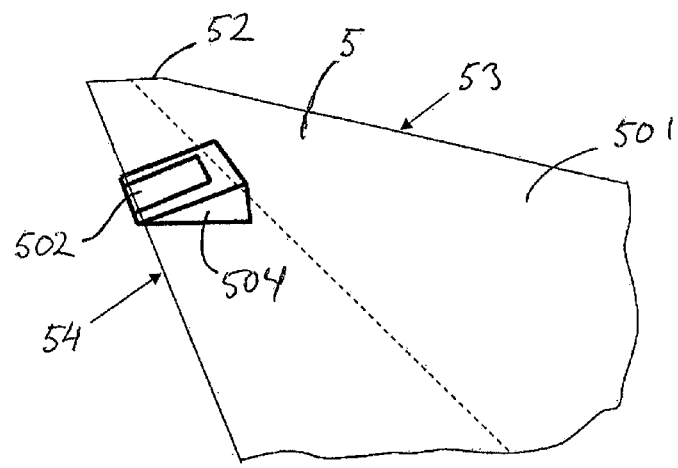
FIG. 2 shows a perspective view of a part of a blade of the wind turbine in FIG. 1, FIG. 3 shown a perspective view of a section of the blade part in FIG. 2.

Reference is made to FIG. 2. Each blade 5 comprises a blade body 501, and lift-regulating means 502, in turn comprising a rigid trailing edge flap 5021. Although only one trailing edge flap 5021 is shown in FIG. 2, it is understood that the lift-regulating means 502 could comprise a plurality of trailing edge flaps distributed in the longitudinal direction of the blade. The trailing edge flap 5021 is hinged so as to be adapted for movement in relation to the blade body 501 so as to regulate the lift of the blade.

Figure 3:
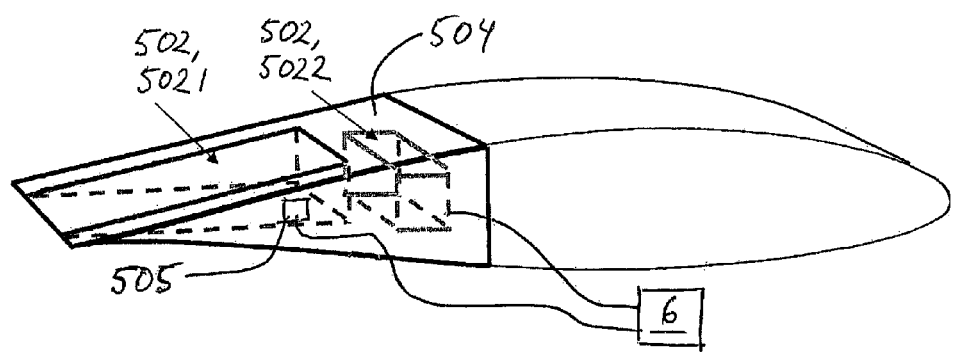

Reference is made to FIG. 3. The lift-regulating means 502 comprises actuation means 5022, in the form of an electric motor, adapted to actuate the trailing edge flap 5021. In this example, The lift-regulating means 502, with the trailing edge flap 5021 and the motor 5022, is part of a module 504. Single or multiple modules could be installed on the rear chord section of the blade along the spanwise direction. The motor 5022 could be embodied as any type of actuator, such as a DC motor, linear motor, PZT actuator, etc. For each flap 5021, there could be single or multiple motors 5022 that could actuate the flap 5021 via a suitable drive mechanism. Alternatively, for each motor 5022, there could be multiple flaps 5021 that could be actuated by the respective motor 5022.

As described closer below, the actuation means 5022, in the form of the motor, is also load sensing means 5022 for determining a load acting on the flap 5021, herein referred to as an actual load. As indicated in FIG. 3, the wind turbine comprises an actuation control unit 6 adapted to control the movement of the flap 5021 via the motor 5022 based on output from the motor 5022. More specifically, in response to the wind load experienced by the flap, the motor will respond with changes in its dynamic variables like current or voltage.

Figure 4:
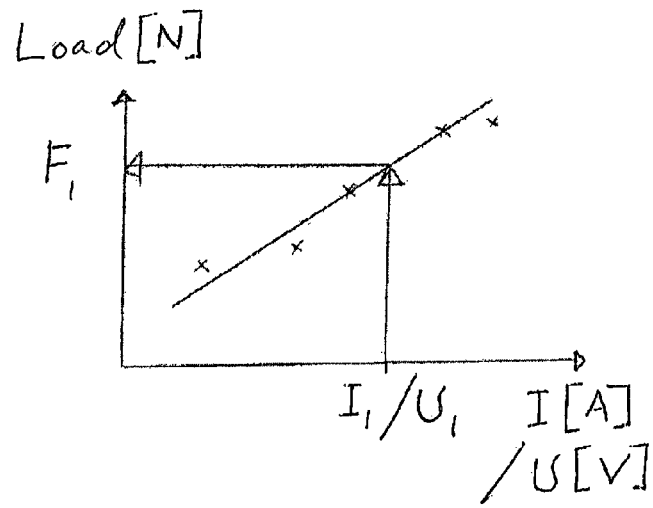
FIG. 4 is a diagram mapping current or voltage of a flap actuation motor to a wind load on the flap.

Reference is made to FIG. 4. The actuation control unit 6 is adapted to, based on the current or voltage of the motor 5022 and a predetermined mapping of the current or voltage to the actual load acting on the flap 5021, determine the actual load acting on the flap 5021.

As indicated in FIG. 3, the blade also comprises movement sensing means 505 for determining the position and movement of the flap 5021. In this example, the movement sensing means 505 is embodied as a deflection sensor 505 adapted to send to the actuation control unit 6 signals corresponding to the position of the flap 5021. The actuation control unit 6 is adapted to determine, based on the signals from the deflection sensor 505, the deflection rate of the flap 5021.

Figure 5:
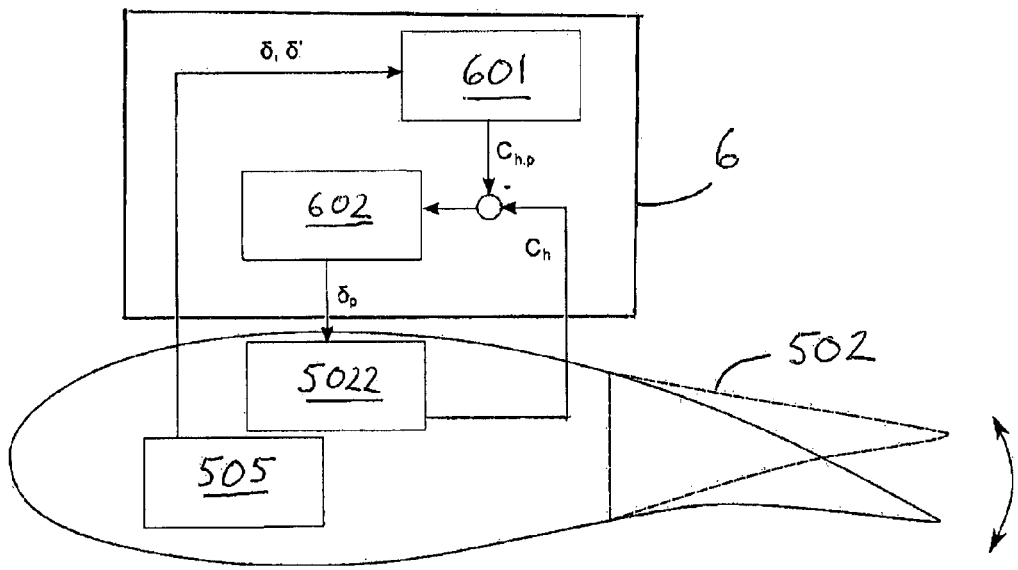
FIG. 5 shows a block diagram of a control system for a trailing edge flap on the blade in FIG. 2, FIG. 6
Figure 6:
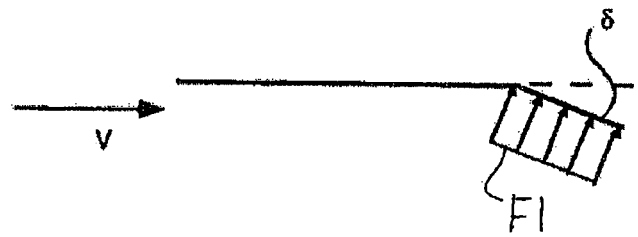
Figure 7:
FIG. 7 shows schematic cross-sections of the blade in FIG. 2 with loads acting of the trailing edge flap.

Reference is made to FIG. 5-7. The actuation control unit 6 comprises an unsteady aero model 601 by which, based on the determined flap deflection (from the deflection sensor 505) and the deflection rate, a load acting on the flap 5021, due to the flap deflection and deflection rate, herein referred to as a deflection load, can be determined. As indicated in FIG. 6, the unsteady aero model 601 determines a first part of the deflection load as a flap load Fl caused by the perturbation air velocity due to the flap deflection S. As indicated in FIG. 7, the unsteady aero model 601 also determines a second part of the deflection load as a flap load F2 caused by the perturbation air velocity due to the flap deflection rate $d\delta/dt$. Thereby, the deflection load acting on the flap 5021, due to the flap deflection and deflection rate, can be determined. As described below, this deflection load is used as a correction of the actual load determined by use of the load sensing means 5022.

In a further embodiment of the invention the aero model could also obtain input regarding wind speed and rotor speed. These inputs could be provided by a dedicated sensor detecting the actual wind speed and a dedicated sensor detecting the actual rotor speed or these inputs could be provided by another source such as the main turbine controller.

In an embodiment the aero model could also be provided with information regarding the spanwise position of the lift-regulating means either in the form of a look-up table, as one or more constants in the aero model or the information could be obtained from the main wind turbine controller.

Referring to FIG. 5, the correction, Chp, i.e. the deflection load due to the flap deflection and deflection rate, determined by the unsteady aero model 601, is subtracted from the actual load, Ch, determined by use of the load sensing means 5022. The resulting corrected load is used as an input to a control signal generator 602, adapted to send control signals to the flap 5021.

The resulting corrected load, determined as outlined above, can also be used to accurately determine the local wind angle of attack.

Figure 8:
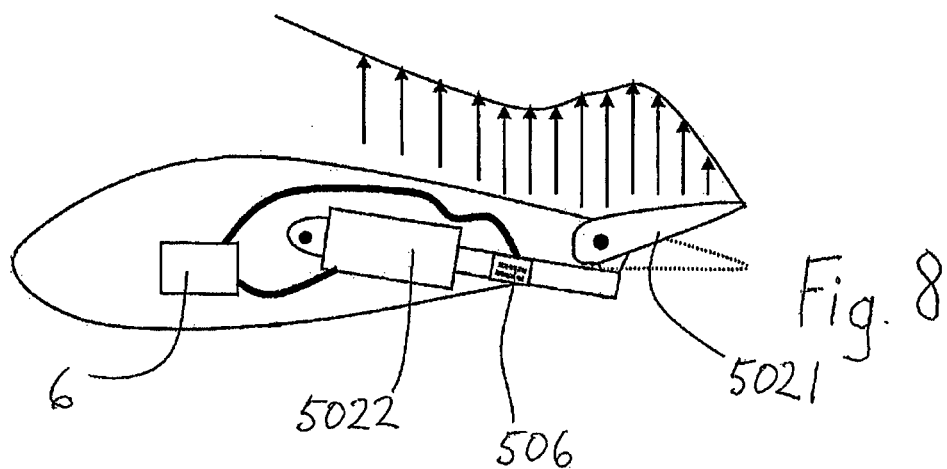
FIG. 8 and FIG. 9 show cross-sections of blades in alternative embodiments of the invention.

It should be noted that the invention is equally applicable to other arrangements of the lift-regulating means and the load sensing means. FIG. 8 shows an embodiment where the actuation means comprises a linear actuator 5022, and the load sensing means comprises a strain gauge 506 arranged on the actuator 5022. An actuation control unit 6 is adapted to control the movement of the flap 5021 via the actuator 5022 based on output from the load sensing means 506, and based on the deflection and deflection rate of the flap similarly to what has been described above.

Figure 9:
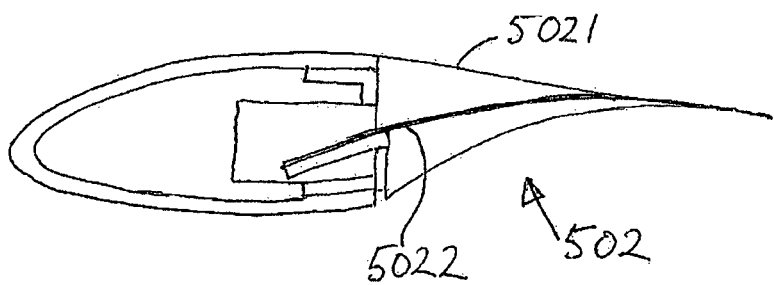

FIG. 9 shows a cross-section of a blade with another arrangement in which the invention is applicable. In the blade, the lift-regulating means 502 comprises a deformable trailing edge 5021, and actuation means in the form of a so called piezoelectric bender actuator 5022, similar to what is disclosed in Barlas, van Wingerden, Hulskamp and van Kuik, "Closed-Loop Control Wind Tunnel Tests on an Adaptive Wind Turbine Blade for Load Reduction", AIAA 2008-1318, 46th AIAA Aerospace Sciences Meeting and Exhibit 7-10 Jan. 2008, Reno, Nev. The actuator 5022 is thin and covered with a soft foam, in order to keep the aerodynamic shape of the trailing edge. The foam is in turn covered with a latex skin, which can expand when the trailing edge is deflected deflection.

The invention claimed is:

1. A wind turbine comprising at least one blade in turn comprising a blade body, a lift regulator adapted for movement in relation to the blade body so as to regulate the lift of the blade, and a load sensor for determining a load acting on the lift regulator, the wind turbine further comprising an actuation control unit adapted to control the movement of the lift regulator based on output from the load sensor, wherein in addition to output from the load sensor, the actuation control unit is adapted to control the movement of the lift regulator based on the movement of the lift regulator.

2. The wind turbine according to claim 1, comprising a movement sensor for determining the movement of the lift regulator.

3. The wind turbine according to claim 1, wherein the actuation control unit is adapted to use at least one control signal sent at a first point in time for the movement of the lift regulator, as a basis for the control of the movement of the lift regulator at a second point in time, subsequent to the first point in time.

4. The wind turbine according to claim 1, wherein the actuation control unit is adapted to control the movement of the lift regulator based on the movement of the lift regulator by the use of an unsteady aero model by which a load acting on the lift regulator due to the movement of the lift regulator, can be determined.

5. The wind turbine according to claim 1, wherein the actuation control unit is adapted to determine, based on the movement of the lift regulator, a correction of said output from the load sensor, and to control the movement of the lift regulator based on said correction.

6. The wind turbine according to claim 1, wherein the lift regulator comprises at least one electric motor in turn comprising the load sensor.

7. The wind turbine according to claim 1, wherein the lift regulator comprises a trailing edge flap, and the actuation control unit is adapted to control the movement of the lift regulator also based on the inertia of the trailing edge flap.

8. A wind turbine comprising at least one blade in turn comprising a blade body, and a lift regulator adapted for movement in relation to the blade body so as to regulate the lift of the blade and comprising an actuator adapted to effect the movement of the lift regulator, the blade further comprising a load sensor for determining a load acting on the lift regulator, the wind turbine further comprising an actuation control unit adapted to control the movement of the lift regulator via the actuator based on output from the load sensor, wherein the actuator comprises an electric motor in turn comprising the load sensor.

9. The wind turbine according to claim 8, wherein the output from the load sensor is a current and/or a voltage of the electric motor, and the actuation control unit is adapted to control the movement of the lift regulator via the actuator based on current or voltage of the electric motor.

10. The wind turbine according to claim 8, wherein, in addition to output from the load sensor, the actuation control unit is adapted to control the movement of the lift regulator via the actuator based on the movement of the lift regulator.

11. A method for controlling a wind turbine comprising at least one blade in turn comprising a blade body and a lift regulator adapted for movement in relation to the blade body so as to regulate the lift of the blade, the method comprising determining a load acting on the lift regulator, and controlling the movement of the lift regulator based on the load acting on the lift regulator, wherein controlling the movement of the lift regulator is also based on the movement of the lift regulator.

12. The method according to claim 11, comprising determining the movement of the lift regulator.

13. The method according to claim 11, comprising using at least one control signal sent at a first point in time for the movement of the lift regulator, as a basis for the control of the movement of the lift regulator at a second point in time, subsequent to the first point in time.

14. The method according to claim 11, comprising determining a load acting on the lift regulator due to the movement of the lift regulator.

15. The method according to claim 11, comprising determining, based on the movement of the lift regulator, a correction of said output from the load sensor, and controlling the movement of the lift regulator based on said correction.

* * * * *